United States Patent
Miller, Sr.

[11] Patent Number: 6,073,290
[45] Date of Patent: Jun. 13, 2000

[54] AIR MATTRESS AND METHOD OF MAKING SAME

[75] Inventor: Craig S. Miller, Sr., Yorba Linda, Calif.

[73] Assignee: Foamex L.P., Linwood, Pa.

[21] Appl. No.: 08/967,694

[22] Filed: Nov. 12, 1997

[51] Int. Cl.[7] .......................... A47C 27/10; A47C 27/14
[52] U.S. Cl. ............................ 5/710; 5/713; 5/932
[58] Field of Search ............................ 5/710, 713, 711, 5/714, 932, 706

[56] References Cited

U.S. PATENT DOCUMENTS

| | | | |
|---|---|---|---|
| 2,998,817 | 9/1961 | Armstrong | 5/713 |
| 3,778,851 | 12/1973 | Howorth | 5/423 |
| 4,267,611 | 5/1981 | Agulnick | 5/713 |
| 5,394,577 | 3/1995 | James et al. | 5/713 |
| 5,647,078 | 7/1997 | Pekar | 5/932 |
| 5,651,151 | 7/1997 | Schild | 5/710 |

*Primary Examiner*—Alexander Grosz
*Attorney, Agent, or Firm*—Natan Epstein; Beehler & Pavitt

[57] ABSTRACT

A one piece air mattress suitable for use in health care settings to aid in prevention of bed sores has air cells permanently attached to a common base sheet along a base perimeter of each cell. The air cells and base sheet are of flexible radio frequency weldable plastic material, and all the air cells can be simultaneously welded to the base sheet in a single welding step using a special welding jig. Air supply conduits are defined by strips bonded to the base sheet in overlying relationship to orifices opening the supply conduits to the air cells, thereby eliminating the need for external air hoses and connections. An alternating pressure air mattress can be made by opening different air supply conduits to alternating sets of the air cells.

10 Claims, 3 Drawing Sheets

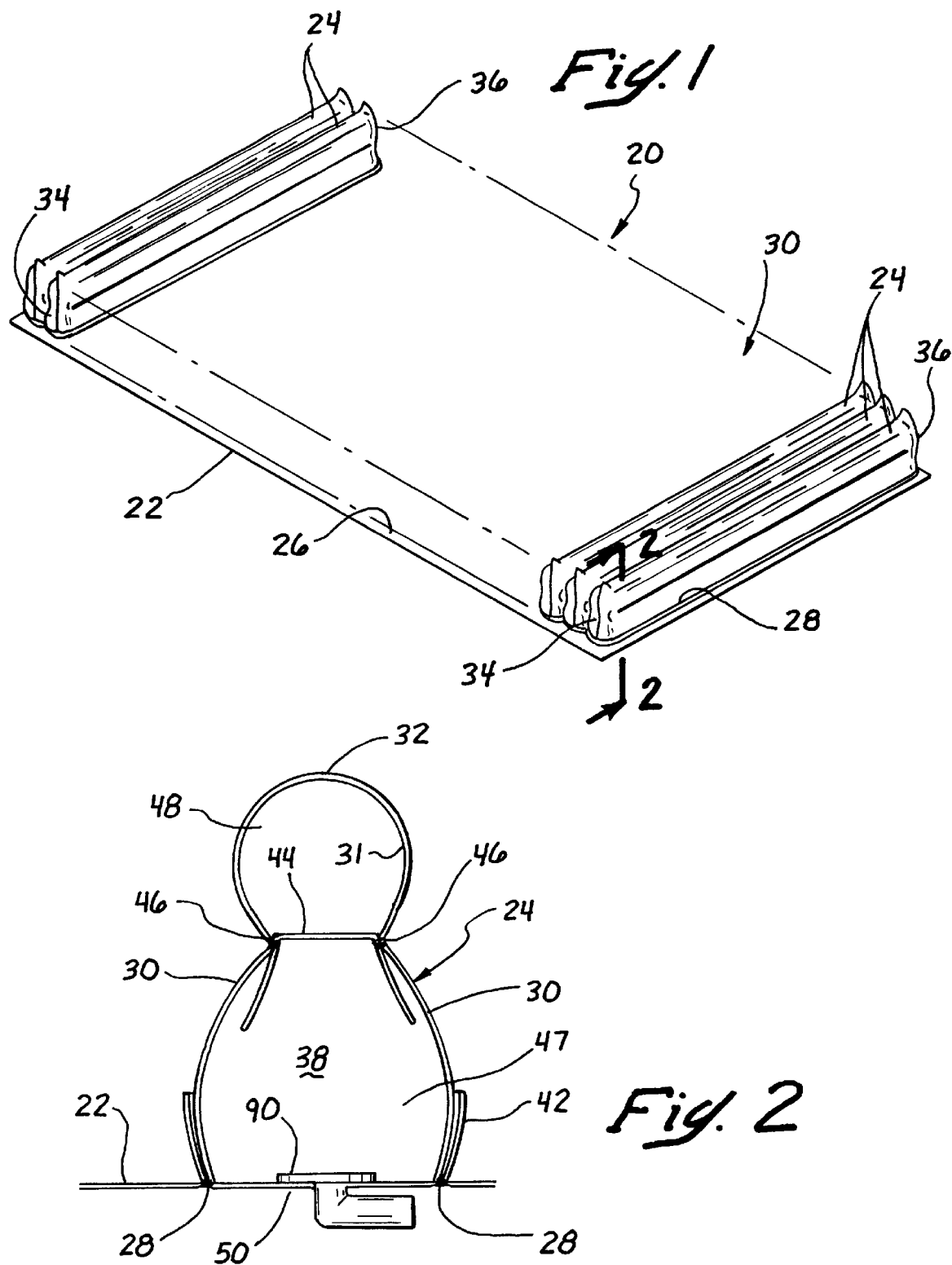

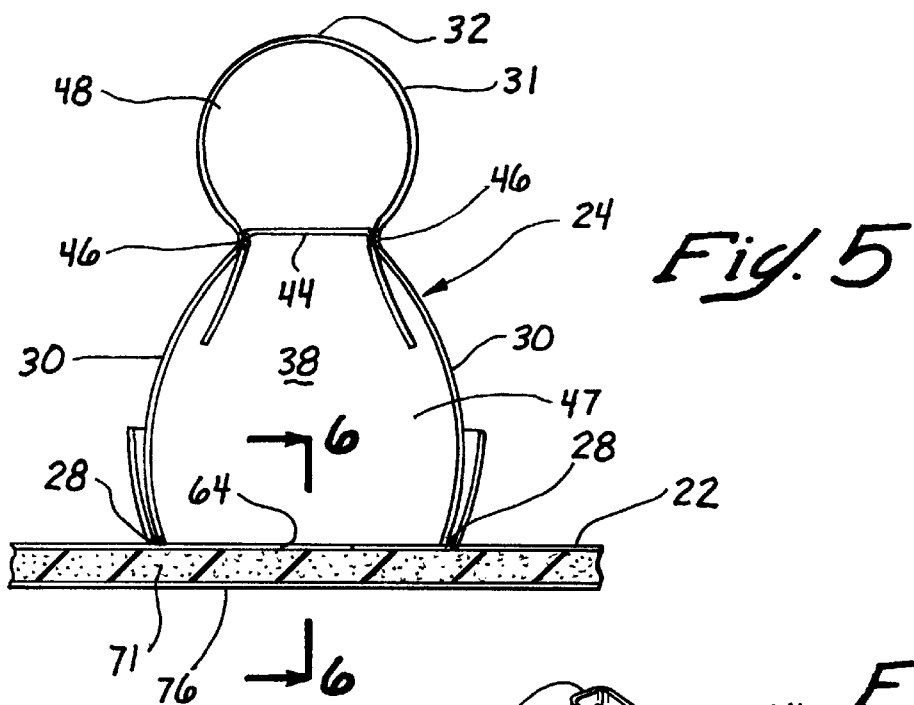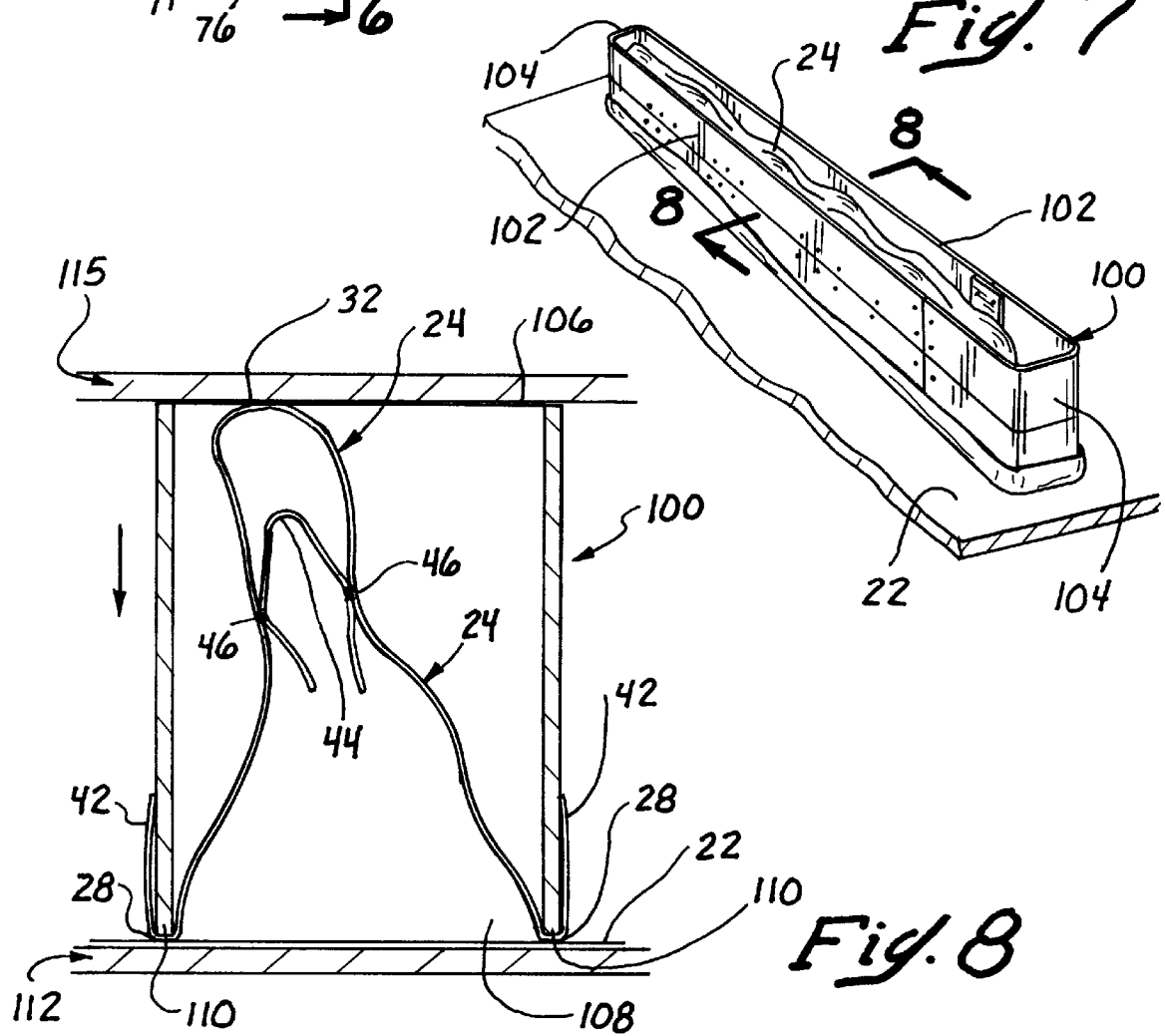

6,073,290

AIR MATTRESS AND METHOD OF MAKING SAME

BACKGROUND OF THE INVENTION

1. Field of the Invention

This invention relates to the field of inflatable mattress devices in general, and, in particular, to inflatable mattresses useful in a health care setting for the prevention and management of skin ulcerations or bedsores.

2. Description of the Prior Art

The usefulness of inflatable mattresses designed to alleviate contact between a long term bedridden patient and the supporting bed surface has long been recognized, and many United States and foreign patents disclose advances and refinements of that technology. Still, shortcoming remain in the prior art devices and particularly in the method of making those devices. Those methods tend to be labor intensive because many separate pieces of sheet material, typically vinyl or urethane sheeting, must be assembled as by radio frequency welding to make the inflatable mattress. Conventional practice has been to weld the pieces individually, a time consuming and therefore costly process. Each precut piece has to be handled manually by a person skilled in radio frequency welding.

The typical mattress configuration involves a base of some kind to which are secured a relatively large number of elongated inflatable chambers or air tubes, each of which spans the full width of the bed. The air tubes are attached to the common base in closely adjacent, mutually parallel relationship to make-up a body support surface.

Various approaches are known for securing the air tubes to a common base, some involving releasable connectors on the bottom of each air tube, others using Velcro type hook-and-loop attachments, for example. Air supply conduits are connected to each air tube for maintaining a desired level of air pressure in each tube. The internal air pressure may be the same in all of the tubes along one bed, or high-low pressure levels may be alternatated in adjacent air tubes in so called alternating air pressure beds, intended to avoid sustained contact against a particular area of the patients body to prevent ulcerations. In all cases, air beds intended for health care use have air chambers which are individually detachable from the base of the bed. While this feature is desirable in that replacement of damaged air tubes is possible without replacement of the entire air bed, it also adds considerably to the cost of manufacture and complicates the set-up and maintenance of the bed.

One piece inflatable mattresses are known, ranging from inexpensive pool floats to better quality heavy duty air mattresses. These, however, are not suitable for use in health care applications because they do not provide individually inflatable air chambers each of which constitutes only a small portion of the patient supporting surface. Furthermore, conventional one piece mattresses are not made by methods which are conducive to making air chambers of arbitrary height, i.e., for making relatively tall air chambers resulting in deep air mattresses, to provide an adequate safety margin against bottoming out of the patient weight onto the base of the air bed under low internal pressure conditions in the air chambers. For this reason, conventional practice requires that each air chamber be formed as a self-contained enclosure, each attached to a common base to make up the air bed. Air distribution is accomplished with small diameter tubing assembled into a complex manifold and individual air connections to each inflatable chamber of the mattress. Manufacture of each such connection entails considerable cost of materials and labor. The result is an air distribution system which constitutes a substantial portion of the total cost of the air mattress.

In U.S. Pat. No. 5,634,225 this applicant has disclosed an air mattress which largely eliminates the need for an external air supply manifold. Instead, air conduits are formed integrally to the common base of the mattress, and each inflatable chamber is detachable connected to the base by means of connectors which also serve as air connectors between the supply conduits and the inflatable chambers. While this approach works well and results in substantial reduction in the cost of the air mattress, there is a continuing need for still lower cost air mattresses suitable for health care applications.

SUMMARY OF THE INVENTION

This invention addresses the aforementioned need by providing an air mattress suitable for health care applications and featuring individual air cells permanently sealed to a common base sheet. Each air cell can be formed of one piece of sheet material folded and sealed along joined side edges. The joined bottom edges of the folded sheet are then turned inside out to expose an interior surface of the piece and form an upturned bottom skirt defining a base perimeter of the air cell. The air cells may all be individually sealed to the base sheet in a single radio frequency welding operation. In a preferred form of the invention air conduits are formed by strips bonded along the base sheet to defined air conduits communicating with the air cells through orifices defined in the base sheet, thereby eliminating the need for any connections and couplings between the air cells and an air distribution conduit or manifold. An air permeable spacer substantially resistant to compression, such as a reticulated foam, may be contained in the air conduit for resisting closure of the air conduit under loading of said mattress. The air conduits may be arranged for alternately inflating and deflating two or more groups of said air cells by providing two or more air conduits, each open to a corresponding group of air cells through corresponding orifices. Alternatively, conventional flexible air hose may be used to supply air to the air cells through suitable air inlets.

Air cells of arbitrary height can be provided on the base sheet by including one or more baffles within each air cell connecting opposites side walls of the air cell at a point between the top of the cell and the base perimeter, to limit spreading apart of the side walls under internal air pressure in the air cell.

A resilient foam pad may be contained in a pouch cavity defined by a pliable containment sheet secured to the underside of the base sheet. The pouch cavity may have an opening for access to and removal of the foam pad, and the opening may have a zippered closure.

The single radio frequency welding sealing operation may be carried out by placing the base sheet and the upturned skirt of each of the air cells between opposite seam forming electrodes of a radio frequency welder and applying radio frequency energy to the electrodes to seal all of the air cells to the base sheet in a single welding step.

The opposite electrodes may include a jig electrode and a plate electrode, the jig electrode having a plurality of cell receiving jigs, each of the jigs having an edge configured for supporting the upturned skirt in continuously contacting relationship with the base sheet during the welding operation.

Protective material may be inserted into each air conduit defined between the base sheet and a strip bonded to the base sheet during the simultaneous seal welding of the air cells to prevent sealing of the air conduit during that operation.

BRIEF DESCRIPTION OF THE DRAWINGS

FIG. 1 is a perspective view of an air mattress according to this invention, illustrating the base sheet and a series of air chambers permanently attached thereto;

FIG. 2 is a cross-sectional view of a representative air chamber taken along line 2—2 in FIG. 1;

FIG. 5 is a cross-sectional view in elevation of a representative air chamber taken along line 5—5 in FIG. 4, illustrating the air conduit with air permeable foam filling;

FIG. 7 is a perspective view of a jig frame holding an air cell during simultaneous radio frequency welding of the air cells to the base sheet; and FIG. 8 is a cross-sectional view taken along line 8—8 in FIG. 7 depicting the air chamber within the rectangular jig frame on the base sheet and between the plate electrodes of a radio frequency welder.

DESCRIPTION OF THE PREFERRED EMBODIMENTS

Figure 3:
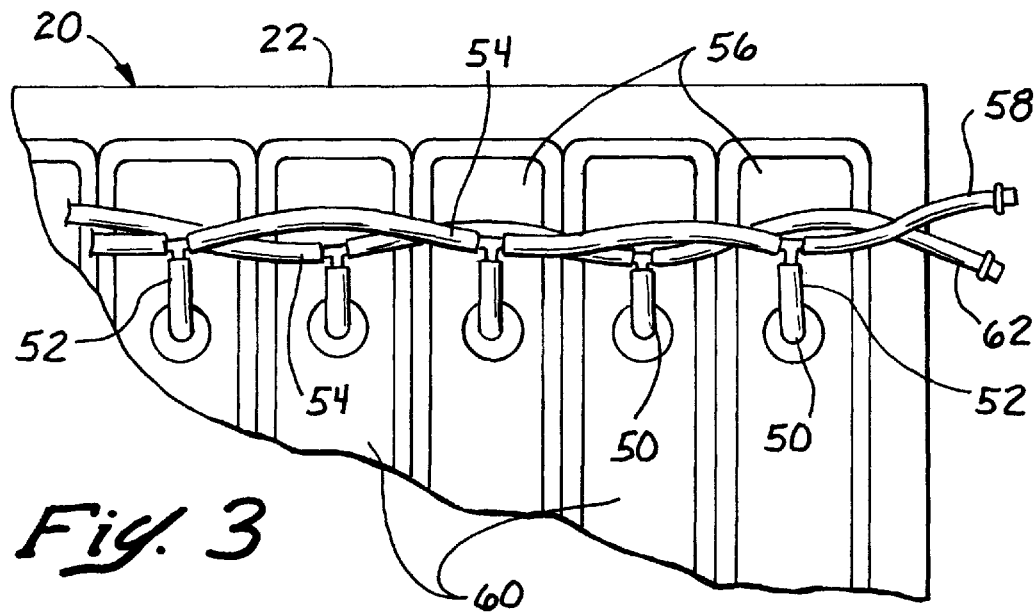
FIG. 3 is a partial view of the underside of the mattress of FIG. 1 in a first embodiment of the invention featuring an external air supply manifold connected in an alternating pressure air mattress configuration.

Turning now to the accompanying drawings, in which like numerals designate like elements, FIG. 1 illustrates a preferred embodiment of the air mattress 20 comprising a base sheet 22 formed of a flexible plastic material, a series of elongated air cells 24 formed of a flexible plastic material permanently sealed to an upper surface 26 of the base sheet along a base perimeter 28 of the air cells 24. The air cells or tubes each extend approximately the full width of the base sheet 22 in closely adjacent mutually parallel relationship, and cover approximately the length of the base sheet 22 to define a patient support surface 30.

FIG. 2 shown in elevational cross-section one air cell 24, which is made of one sheet 31 folded to define a cell top 32 and a pair side walls 30. In each air cell the folded sheet 31 has adjacent side edges at each end of the elongated shape joined to make closed first ends 34 and closed second ends 36 of a cell interior or cavity 38. The lower portions of the side wall 30 are turned inside out and upwards along the entire length of the air cell forming an upturned skirt 42 to define the base perimeter 28 which is permanently joined in an airtight seal to the top surface 26 of the base sheet 22. Depending on the height of the air cell between the base sheet 22 and the cell top 32, it may be desirable to attach a baffle 44 within the air cell 24 connecting the opposite sides 30 at a point 46 between the top 32 and the base perimeter 28. The baffle 44 is apertured or otherwise constructed to permit free air flow from a lower portion 47 of the air cell 24 to an upper portion 48 in the cell 28.

In one form of the invention, the air supply system includes at least one orifice 50 in the base sheet 22 opening into each of the air cells 24, a connecting fitting 52 sealed to the orifice 50 and an air hose manifold 54 connected to the fittings 52. In a constant pressure mattress configuration a single such manifold is connected for supplying pressurized air to all of the cells 24. In an alternating pressure air mattress two air hose manifolds 54 are provided, each connected for supplying air to a corresponding group of alternate air cells 24, as shown in FIG. 3, such that a first set 56 of alternating air cells 24 are connected to a first air supply line 58 and a second set 60 of alternating air cells 24 are connected to a second air supply line 62.

Figure 6:
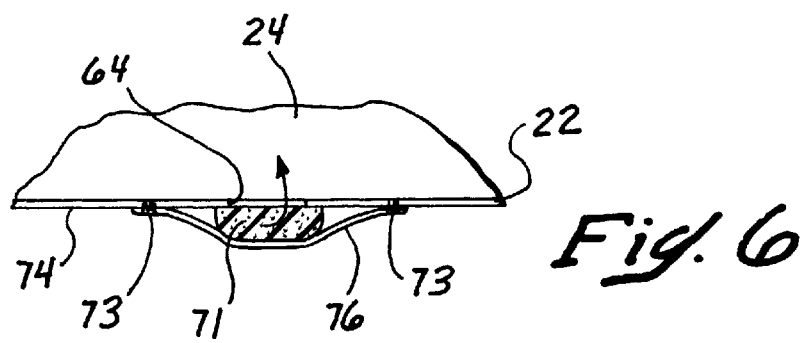
FIG. 6 is a cross-sectional detail view of the air conduit taken along line 6—6 in FIG. 5.
Figure 4:
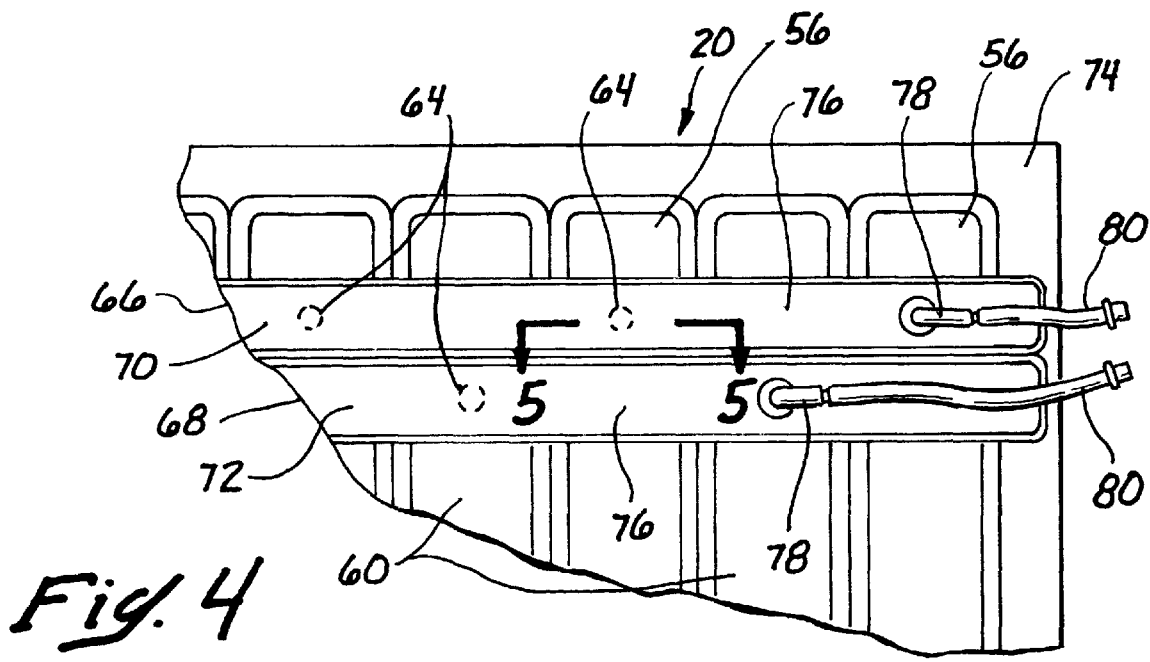
FIG. 4 is a partial view of a second embodiment of the invention in which strips applied to the base sheet define two air conduits each open to an alternate group of air cells, eliminating the need for an external air supply manifold.

FIGS. 4, 5, and 6 illustrate a second preferred embodiment of the air mattress 20, including an alternative air supply system comprising an orifice 64 in the base sheet 22 positioned under each air cell 24 with the orifices 64 being arranged in a first row 66 below a first set 56 of alternating air cells 24 and a second row 68 below a second set 60 of alternating air cells 24. First and second air-permeable foam filled conduits 70, 72 respectively are each defined by a strip 76 of sheet material, which may be the same or similar material as the base sheet 22, bonded or welded to the lower surface 74 of the base sheet 22. The two strips 76 extend respectively under the first row of orifices 66 and under the second row of orifices 68 to define parallel air conduits, each supplied with compressed air through an air supply fitting 78 and an air supply hose 80. An air permeable resilient material such as a reticulated foam 71 is contained in each air conduit 70, 72 and serves to prevent the air conduits from being pressed closed when the mattress 20 is under load.

The preferred method of making the air mattress just described is by radio frequency welding all the air cells to the base sheet in a single welding step or operation. A base sheet 22 is cut to the desired width and length dimensions and orifices 50 or 64 are made in the base sheet 22. An air supply fitting 52 having a sealing disk 90 is inserted into each orifice 50 and positioned as in FIG. 2 and radio frequency welded in that position.

A series of elongated air cells 24, illustrated in FIGS. 1 and 2, are fabricated by cutting a rectangular portion of flexible plastic sheet material 30, folding the rectangular portion in half to form two side walls 30, radio frequency welding the side edges to seal the first ends 34 and second ends 36, forming an air cell 24, and folding up a lower portion of the air cell 24 to form a skirt 42 and define a base perimeter 28. The baffle 44 too is attached as previously described by radio frequency welding.

FIGS. 7 and 8 illustrate the preferred method of simultaneously attaching the air cells 24 to the base sheet 22. This is done by inserting the air cell 24 into a metallic jig shaped as a rectangular frame 100, having two essentially parallel sides 102 and two essentially parallel ends 104, and being open at the top 106 and the bottom 108. Each air cell is placed upright in a corresponding metallic, e.g. aluminum, jig frame 100, as best understood from FIG. 8, with the cell contained inside the frame but the upturned skirt folded under the lower edge 110 of the jig frame, so that the skirt 42 remains outside of the rectangular jig 100. The jig frame with the cell 24 are then placed on the base sheet which in turn lies on a lower electrode plate 112 of a conventional but large radio frequency welding machine. The air cell 24 is positioned so that it overlies any required air supply orifices 50, 64 in the base sheet, i.e. the air orifice or orifices lie within the base perimeter 29 of the air cell 24. An upper electrode plate 115 of the radio frequency welder is then applied against the upper edge of the jig frame 100, sufficient radio frequency energy is applied to the electrode plates 112, 115 to weld the outturned interior surface of skirt 42 to the upper surface 26 of the base sheet 22 along the base perimeter 28 of the air cell 24. By this same process all of the air cells 24 of the air mattress 20 are simultaneously welded to the base sheet, each air cell 24 in a corresponding jig frame 100, the frames 100 being arranged side by side in the welding machine analogously to the desired parallel arrangement of the air cells 24 in the mattress 20 in FIG. 1.

The alternating pressure version of the air mattress 20 shown in FIGS. 3–6 is made in the same manner, except that two rows of alternating orifices 64 are made in the base sheet, as shown in FIG. 4, and the strips 76 are first radio frequency welded to the underside 74 of the base sheet 22 along spaced apart weld seams 73 to define the air supply conduits 70, 72. A protective, non radio-frequency weldable layer is inserted between the strip 76 and the base sheet to prevent the air conduits from being welded shut during the subsequent cell welding operation, and the air cells 24 are then welded onto the base sheet 22 as described above in connection with FIGS. 7 and 8. The protective layer may be a layer of ordinary adhesive paper tape, which can be left adhered to the interior surface of the strip 76 without prejudice to the good performance of the mattress 20.

While the invention has been disclosed with reference to specific embodiments it must be understood that those embodiments are susceptible of many changes, substitutions and modifications such as will be readily apparent to those having ordinary skill in the art without thereby departing from the scope and spirit of this invention, which is defined by the following claims.

What is claimed is:

1. An air mattress comprising:

a base sheet formed of a generally planar flexible plastic sheet material;

a plurality of elongated air cells formed of a flexible plastic sheet material permanently attached in air sealing relationship to an upper surface of said base sheet along a base perimeter of each of said air cells; and air supply means connected for supplying pressurized air thereby to inflate said air cells on said base sheet;

characterized in that each said air cell is made of a sheet of said pliable plastic sheet material folded to form a top and two side walls of said air cell, said side walls having first and second side edges joined to make closed opposite side ends of said air cell, said side walls having lower portions defining said base perimeter, and wherein said lower portions include upturned portions of said side walls having an inner surface permanently and sealably attached to said upper surface of said base sheet.

2. The air mattress of claim 1 wherein said air supply means are connected for alternately inflating and deflating two or more groups of said air cells.

3. The air mattress of claim 1, wherein said air supply means comprises:

a plurality of orifices in said base sheet opening into said air cells and one or more manifolds connected for distributing compressed air through said orifices to said air cells.

4. The air mattress of claim 3, wherein said one or more manifolds comprises a pair of manifolds connected to said orifices such that a first set and a second set of alternating air cells may each be alternately supplied with compressed air by a corresponding one of said manifolds.

5. The air mattress of claim 3, wherein said one or more manifolds each comprises a strip of pliable impermeable sheet material bonded to said base sheet so as to define with said base sheet an air conduit in fluidic communication with a corresponding number of said orifices, such that compressed air supplied to an inlet of said air conduit is distributed through said orifices to said air cells.

6. The air mattress of claim 5 further comprising air permeable spacer means substantially resistant to compression contained in said air conduit for resisting closure of the air conduit under loading of said mattress.

7. The air mattress of claim 6 wherein said spacer means comprises a reticulated synthetic foam.

8. The air mattress of claim 1, wherein each said air cell further comprises:

a baffle within said air cell connecting opposites side walls of said air cell at a point between a top and said base perimeter of said air cell thereby to limit spreading apart of said side walls under internal air pressure in said air cell.

9. An air mattress comprising:

a base sheet formed of a generally planar flexible plastic sheet material;

a plurality of elongated air cells formed of a flexible plastic sheet material permanently attached in air sealing relationship to an upper surface of said base sheet along a base perimeter of each of said air cells; and air supply means connected for supplying pressurized air thereby to inflate said air cells on said base sheet;

wherein said air supply means comprises a plurality of orifices in said base sheet opening into said air cells and one or more manifolds connected for distributing compressed air through said orifices to said air cells;

wherein said one or more manifolds each comprises a strip of pliable impermeable sheet material bonded to said base sheet so as to define with said base sheet an air conduit in fluidic communication with a corresponding number of said orifices, such that compressed air supplied to an inlet of said air conduit is distributed through said orifices to said air cells;

air permeable spacer means substantially resistant to compression contained in said air conduit for resisting closure of the air conduit under loading of said mattress;

a resilient foam pad of dimensions similar to said base sheet; and a pliable containment sheet secured to an underside of said base sheet for defining a pad receptacle, said foam pad contained in said receptacle, and at least one opening into said pad receptacle for removably inserting said foam pad thereinto.

10. The air mattress of claim 9 wherein said spacer means comprises a reticulated synthetic foam.

* * * * *